(12) United States Patent
Tanaka et al.

(10) Patent No.: US 7,293,147 B2
(45) Date of Patent: Nov. 6, 2007

(54) STORAGE SYSTEM CONTROLLING EXCLUSION/PRIORITY FOR I/O ACCESS

(75) Inventors: Atsushi Tanaka, Saitama (JP); Kiyohiro Obara, Hachioji (JP); Hiroaki Odawara, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 10/962,396

(22) Filed: Oct. 13, 2004

(65) Prior Publication Data

US 2005/0066125 A1    Mar. 24, 2005

Related U.S. Application Data

(63) Continuation of application No. 09/918,796, filed on Aug. 1, 2001, now Pat. No. 6,820,168.

(30) Foreign Application Priority Data

Jan. 25, 2001    (JP) .............................. 2001-016503

(51) Int. Cl.
*G06F 12/00* (2006.01)
*G06F 12/16* (2006.01)
*G06F 13/30* (2006.01)

(52) U.S. Cl. ...................... 711/163; 711/151; 711/158; 711/154; 711/114

(58) Field of Classification Search .................... None
See application file for complete search history.

(56) References Cited

U.S. PATENT DOCUMENTS

| | | | |
|---|---|---|---|
| 5,414,851 A | 5/1995 | Brice, Jr. et al. | |
| 5,483,654 A | 1/1996 | Staron et al. | |
| 5,488,724 A | 1/1996 | Firoozmand | |
| 5,553,305 A | 9/1996 | Gregor et al. | |
| 5,636,376 A | 6/1997 | Chang | |
| 5,742,792 A * | 4/1998 | Yanai et al. | 711/162 |
| 6,192,389 B1 | 2/2001 | Ault et al. | |
| 6,343,324 B1 * | 1/2002 | Hubis et al. | 709/229 |
| 6,453,392 B1 | 9/2002 | Flynn, Jr. | |
| 6,745,281 B1 | 6/2004 | Saegusa | |

FOREIGN PATENT DOCUMENTS

| | | |
|---|---|---|
| JP | 5-120194 | 10/1991 |
| JP | 2000-20367 | 6/1998 |
| JP | 2000-020447 | 7/1998 |
| JP | 2000-112804 | 10/1998 |
| JP | 2001-14261 | 6/1999 |

OTHER PUBLICATIONS

European Search Report dated Apr. 24, 2007.

* cited by examiner

*Primary Examiner*—Hyung Sough
*Assistant Examiner*—Mardochee Chery
(74) *Attorney, Agent, or Firm*—Reed Smith LLP; Stanley P. Fisher, Esq.; Juan Carlos A. Marquez, Esq.

(57) ABSTRACT

A virtual private volume control system, wherein in a data frame of a command issued from an OS, an ID number for identifying the OS is attached to the command; inside the disk apparatus, exclusion/priority processing is controlled, based on the ID number; thereby enhancing the transaction processing performance of a complex of servers and the disk apparatus as a whole.

5 Claims, 20 Drawing Sheets

FIG.6

EXCLUSION/PRIORITY CONTROL TABLE [LOGICAL VOLUME#0]    500

|       | LPAR#0 | LPAR#1 | LPAR#2 | LPAR#3 |
|-------|--------|--------|--------|--------|
| WWN#0 | ○ | × | × | × |
| WWN#1 | × | PRIORITY CONTROL | EXCLUSION CONTROL#2 | × |
| WWN#2 | ○ | ○ | × | × |
| WWN#3 | × | — | — | — |

505 — WWN#0
510 — WWN#1
515 — WWN#2
520 — WWN#3

EXCLUSION/PRIORITY CONTROL TABLE [LOGICAL VOLUME#0] (WWN-LPAR)  1625-a

|  | LPAR#0 | LPAR#1 | LPAR#2 | LPAR#3 |
|---|---|---|---|---|
| WWN#0 | O | × | O | × |
| WWN#1 | × | PRIORITY CONTROL | EXCLUSION CONTROL#2 | × |
| WWN#2 | O | O | × | × |
| WWN#3 | × | — | — | — |

EXCLUSION/PRIORITY CONTROL TABLE [LOGICAL VOLUME#0] (WWN-APL)  1625-b

|  | APL#0 | APL#1 | APL#2 | APL#3 |
|---|---|---|---|---|
| WWN#0 | × | O | O | × |
| WWN#1 | × | PRIORITY CONTROL | EXCLUSION CONTROL#2 | × |
| WWN#2 | × | O | × | × |
| WWN#3 | × | — | — | — |

STORAGE SYSTEM CONTROLLING EXCLUSION/PRIORITY FOR I/O ACCESS

This application is a continuation application of U.S. application Ser. No. 09/918,796 filed on Aug. 1, 2001 now U.S. Pat. No. 6,820,168. Priority is claimed based on U.S. application Ser. No. 09/918,796 filed on Aug. 1, 2001, which claims priority to Japanese Patent Application No. 2001-016503 filed on Jan. 25, 2001.

BACKGROUND OF THE INVENTION

1. Field of the Invention

The present invention relates to server and storage techniques, and more particularly, relates to effective techniques for a complex of information processing machines and storage apparatus, as a system formed by interconnecting its components such as a plurality of storage units and CPUs and required to have the ability of providing high security, high response performance and numbers of transactions.

2. Description of Related Art

Combination of servers having a plurality of CPUs, memories and I/O adapters and disk apparatus with a large storage capacity now realizes environment allowing a plurality of users to share these resources. Consequently, protecting the security of individual users and efficiently using the resources have become requirements. To achieve logical volume exclusion control, conventional servers and disk apparatus complexes adopted a method that the I/O adapters installed in the servers are assigned their ID number and the storage side distinguishes them by ID number. An exemplary configuration of a conventional servers and disk apparatus complex is shown in FIG. 2. Here, a server #0 (110) and another server #1 (120) have a plurality of operating systems OS #0 (155) to OS #2 (120) installed in them respectively. These servers respectively have I/O adapters 118 and 128 and are connected to storage 170. When accessing the storage 170, the servers issue data frames 130, 135, and 140 from their I/O adapters 118 and 128. The descriptions contained in the data frames 130, 135, and 140 include World Wide Name (WWN) (205, 215, 225) to which a specific identification number per I/O adapter 118, 128 is assigned. On the other hand, the disk apparatus 170 has I/O adapters 173 and 174 and receives the above data frames 130, 135, and 140. In the disk apparatus 170, channel controllers 175 and 176 which perform internal control derive each WWN 205, 215, 225 which equals any ID number from the received data frames 130, 135, and 140. The channel controllers 175 and 176 perform exclusion/priority control for logical volumes 195 and 196 by checking each WWN 205, 215, 225 against Exclusion/Priority Control Tables 182 and 183 stored in advance in local memories 180 and 181, respectively. For example, it is assumed that logical volume #0 (195) is exclusively allocated for the OS #2 (150) of the server #0 (110) and logical volume #1 (196) is exclusively allocated for the OS #1 (160) of the server #1 (120). Now, if the OS #1 (160) erroneously accesses the logical volume #0 (195), the data frame 140 for this access includes the WWN 225 that contains ID number 001, and thus the channel controller 176 recognizes that access permission for the volume is granted only to ID number 000 by referring to the Exclusion/Priority Control Table 183. Then, the channel controller 176 notifies the OS #1 (160) that the access has been rejected. As for the art regarding disk apparatus provided with such logical volume exclusion/priority control, there is a "Storage Subsystem" disclosed in JP-A-20447/2000.

Meanwhile, if a plurality of resources exist in a server, there are techniques of allocating and using these resources among a plurality of OSs. Using these techniques, it is made possible to make efficient use of server's CPUs, memories and other resources. As one example of these techniques, there is LPAR (Logical PARTioning). If this LPAR is applied, a Hypervisor 430 exists as software for managing a plurality of OSs, whereby it becomes feasible that CPUs, memories, and I/O devices are dynamically allocated to the OSs. For, for example, the server #1 (120) shown in FIG. 2, there are four CPUs #10 to #13. By applying the LPAR, it is possible to allocate CPU #10 to the OS #0 (155) and CPUs #11, #12, and #13 to the OS #1 (160). As for the main memory 125, it is also possible to allocate its available space between the OS. #0 (155) and the OS #1 (160) at an appropriate ratio. If there are a plurality of I/O adapters, they can be allocated to the OS #0 (155) and the OS #1 (160). However, because there is only one adapter in this example, the I/O adapter 128 is shared by both OSs. As regards this kind of art, there is a "Virtual Machine System" disclosed in JP-A-301795/1998.

Furthermore, in JP-A-112804/2000, description is made that in a virtual machine system wherein a plurality of OSs operate, sharing files, I/O instructions with OS number attached thereto are issued to the disk apparatus to prevent one OS from accessing a data file for another OS. Furthermore, In JP-A-140844/1992, description is made that the disclosed invention includes an I/O analysis means for analyzing I/O instructions issued from the OSs and the I/O analysis means appends an OS identifier to each I/O instruction it received, whereby exclusion control is accomplished during concurrent operation of a plurality of OSs.

As described above, the disk apparatus 170 distinguishes each WWN 205, 215, 225, and thereby exclusion/priority control of the logical volumes 195 and 196 can be accomplished. Moreover, applying the LPAR makes it possible to efficiently allocate CPUs, memories, and I/O devices to a plurality of OSs in a server. However, generally, in comparison with the rate at which the number of CPUs in a server increases, the number of I/O devices does not increase so much, and in most cases, an I/O device is shared by the CPUs. This is because of cost saving and the physically large size of an I/O device having an interface to the external. If logical volume exclusion/priority control is performed under these conditions where an I/O device is shared, some problem making the exclusion/priority control impossible arises as below. For example, the OS #0 (155) and the OS #1 (160) exist in the same server shown in FIG. 2 and share the I/O adapter 128. However, the data frames issued from both OSs include either WWN 125 or 225, but these WWNs are assigned the same ID number "001" because both the OSs share the I/O adapter 128. Therefore, the disk apparatus 170 cannot perform exclusion/priority control for these two data frames. Consequently, even if the logical volume #0 (195) is exclusively allocated for the OS #0 (155) and access permission for this volume is not granted to other OSs, it becomes possible for the OS #1 (160) to access the logical volume #0 (195) for the above reason.

On the assumption that a plurality of OSs running on a server share an I/O device and a storage system, it is an primary object of the present invention to improve the technique of performing the exclusion/priority control of logical volumes, each of which is exclusively allocated for one of the OSs, by providing the server side with a means for attaching OS-specific ID information to a data frame of command and the disk apparatus side with a means for deriving the OS-specific ID information from the data frame.

It is another object of the present invention to provide a technique by which tables containing the descriptions of a plurality of exclusion/priority control methods are created on the disk apparatus, thereby allowing selection out of the plurality of exclusion/priority control methods when performing such control.

It is yet another object of the present invention to provide a technique by which a plurality of exclusion/priority control methods are made available as instructions that the server can issue to the disk apparatus.

To solve the above problem, a virtual private volume control method is provided wherein servers on which a plurality of OSs run communicate with disk apparatus in such a manner that, when one of the OSs on a server issues an access command, the server assigns an ID number for identifying the OS and sends the command with the assigned ID number attached thereto; the disk apparatus receives the sent command, derives the ID number, and returns a response that indicates whether to process or reject the access to a logical volume with the ID number attached thereto, depending on whether the logical volume is accessible to the derived ID number; and the server receives the response. Moreover, the server includes a means for coding the ID number per OS in a data frame that it sends to the disk apparatus when accessing the disk apparatus. The disk apparatus includes means for deriving the ID number per OS and performing the exclusion/priority control for the access, based on the ID number. Furthermore, the server includes a means for sending information about an accessible logical volume or exclusion/priority control per OS to the disk apparatus. Furthermore, the disk apparatus includes tables into which the information about an accessible logical volume or exclusion/priority control per OS is registered.

Hereupon, the plurality of OSs may be virtually different multiple OSs belonging to different users, though they may be same OS products (for example, OS #0 is Windows NT [a registered trademark of Microsoft Corp., US in the US and other countries: the same shall apply hereinafter] and OS #1 is also Windows NT or OS #0 is UNIX [a registered trademark of UNIX System laboratories in the US and other countries, licensed exclusively to X/Open Company Ltd.; the same shall apply hereinafter] and OS #1 is also UNIX).

Other and further objects, features and advantages of the invention will appear more fully from the following description.

BRIEF DESCRIPTION OF THE DRAWINGS

A preferred form of the present invention illustrated in the accompanying drawings in which:

FIG. 6 shows an exemplary Exclusion/Priority Control Table for use in Embodiment 1 of the present invention;

FIG. 18 shows exemplary Exclusion/Priority Control Tables for use in Embodiment 3 of the present invention;

DETAILED DESCRIPTION OF THE PREFERRED EMBODIMENTS

Embodiment 1

A preferred Embodiment 1 of the present invention is illustrated in the appended drawings and described in detail below.

Figure 1:
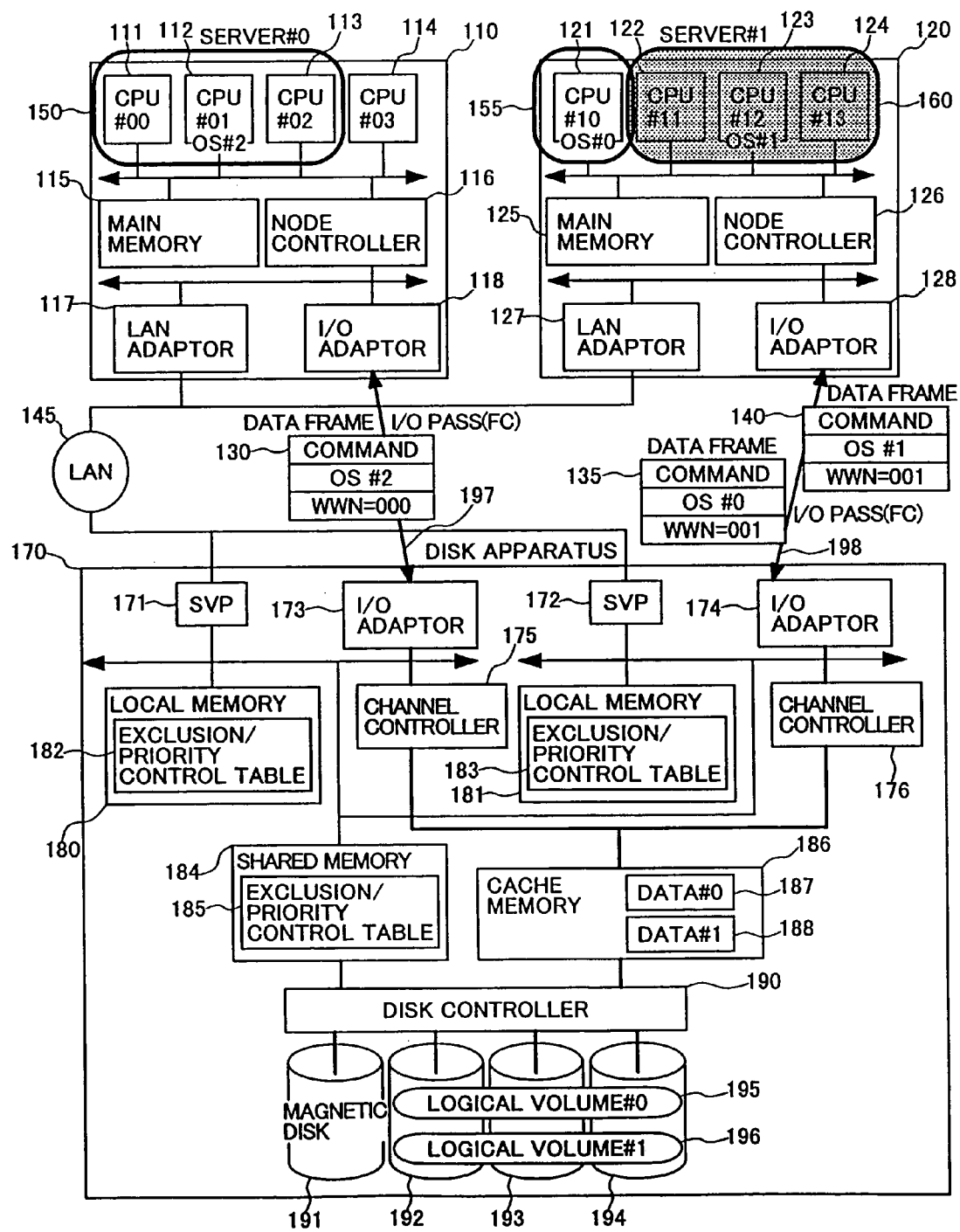
FIG. 1 shows an overall structural drawing of Embodiment 1 of the present invention.
Figure 2:
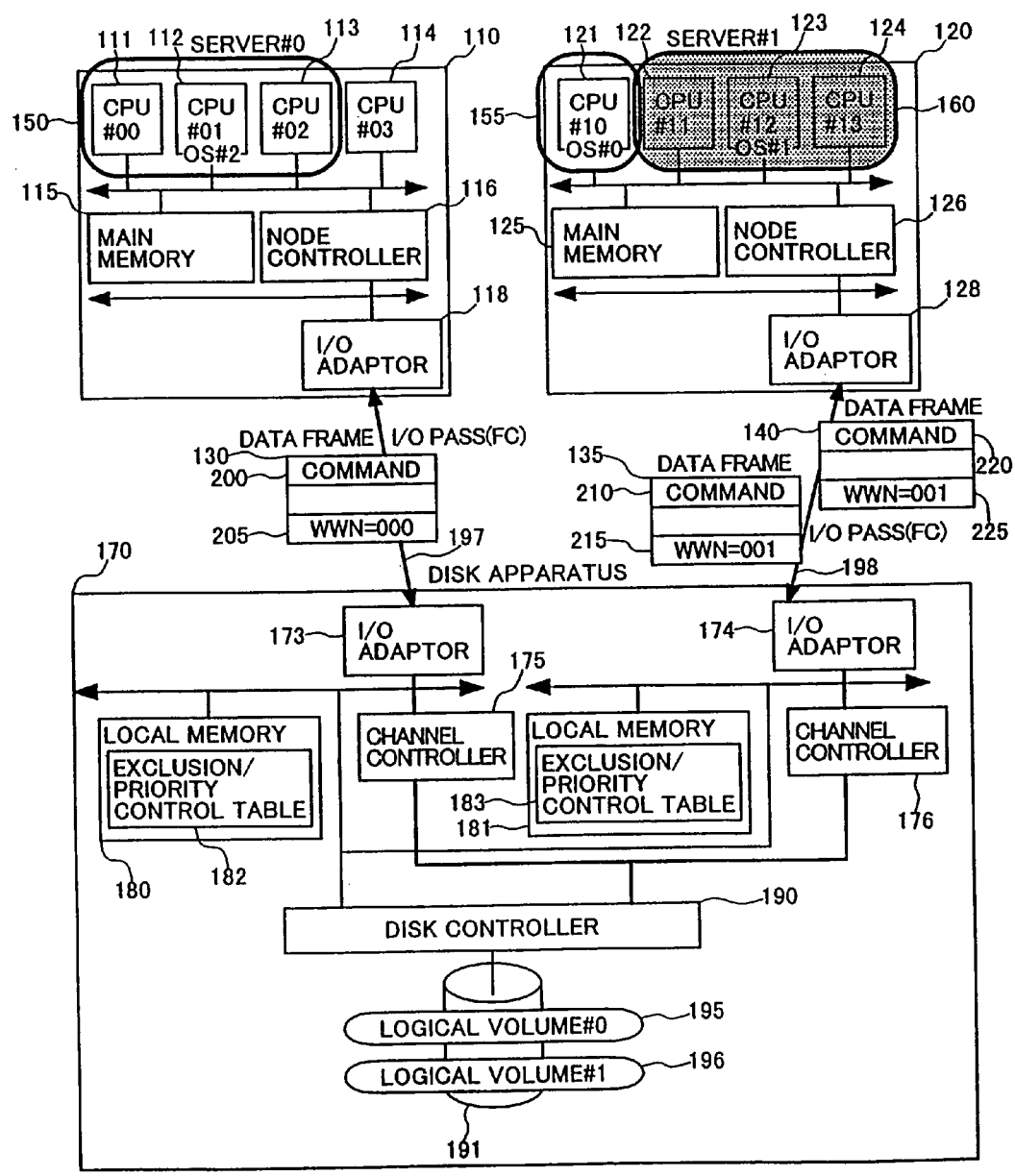
FIG. 2 shows a structural drawing of a conventional storage system having internal exclusive control means according to prior art.

FIG. 1 is an overall structural drawing of a virtual private volume control system configured, according to Embodiment 1 of the present invention. Reference numerals 110 and 120 denote servers on which OSs and applications are run and the servers issue instructions such as data read, write, etc. to a disk apparatus 170. Reference numerals 111, 112, 113, 114, 121, 122, 123, and 124 denote CPUs. A plurality of CPUs are installed on server #0 and server #1 (110, 120) and execute parallel processing for the OSs and applications. Reference numerals 115 and 125 denote main memories to store data that the CPUs directly use. Reference numerals 116 and 126 denote node controllers that control data transfer between the CPUs and a lower adapter such as an I/O adapter and a LAN adapter. Reference numerals 117 and 127 denote LAN controllers that control data transfer between the CPUs (111, 112, 113, 114, 121, 122, 123, and 124) and external equipment connected to a LAN 125. Reference numerals 118, 128, 173, and 174 denote I/O adapters that control data transfer between the CPUs (111, 112, 113, 114, 121, 122, 123, and 124) and the disk apparatus 170. In the system configuration example presented in FIG. 1, the plurality of CPUs on a server share the main memory, LAN adapter and I/O adapter on the server. Reference numeral 145 denotes the LAN (Local Area Network) that is a communication path across which data passes to be transferred between the servers and the disk apparatus. Using this LAN 145, the disk apparatus 170 obtains information about exclusion/priority control from the servers 110 and 120. Reference numeral 170 denotes the disk apparatus that reads or writes data in accordance with an instruction from server #0 or #1 (110, 120). Reference numerals 171 and 172 denote SVPs (Service Processors) that receive control information for the disk apparatus 170 sent from server #0 or #1 (110, 120) via the LAN 145 and change the required control information for the disk apparatus 170. Reference numerals 175 and 176 denote channel controllers that analyze a command incoming from server #0 or #1 (110, 120), retrieve necessary data and perform sending/reception. Reference numerals 180 and 181 denote local memories to store control information required for controlling the channel controllers. Reference numeral 184 denotes a shared memory to store control information required to control communication between the channel controllers 175 and 176. Reference numerals 182, 183, and 185 denote Exclusion/Priority Control Tables into which control information required to perform exclusion/priority control of logical volumes is registered. These tables will be explained in detail with reference to FIG. 6. Reference numeral 186 denotes a cache memory to store data that server #0 or #1 (110, 120) needs. However, the cache memory does not store all data, but stores only data that is very frequently used. Reference numerals 187 and 188 denote data stored in the cache memory 186. Reference numeral 190 denotes a disk controller that performs data sending/reception control between the cache memory 186 and magnetic disks 191, 192, 193, and 194. Reference numerals 191, 192, 193, and 194 denote magnetic disks that are storage units in which data is eventually stored. Reference numerals 150, 155, and 160 denote OSs that control access from applications. Reference numerals 195 and 196 denote logical volumes that are allocated for OS #0 (150), OS #1 (155), and OS #2 (160). An instruction to access logical volume #0 (195) or #1 (196) issued from one of the OS #0 (150), OS #1 (155), and OS #2 (160) is converted to a command and control information in the I/O adapter 118 or 128 and the command and control information are coded in a data frame 130, 135, or 140 and transferred to the disk apparatus 170. The detail on what items are contained in a data frame will be explained with reference to FIG. 3. Reference numerals 197 and 198 denote I/O paths, each serving as a data communication path that connects either server #0 or #1 (110, 120) and the disk apparatus. Although the I/O paths of fiber channel (FC) are shown in this example, I/O paths of other standardized types may be used and such minor modification comes within the range of the present invention. In the above description, the plurality of OSs may be virtually different multiple OSs belonging to different users, though they may be same OS products (for example, OS #0 is NT and OS #1 is also NT or OS #0 is UNIX and OS #1 is also UNIX).

Figure 3:
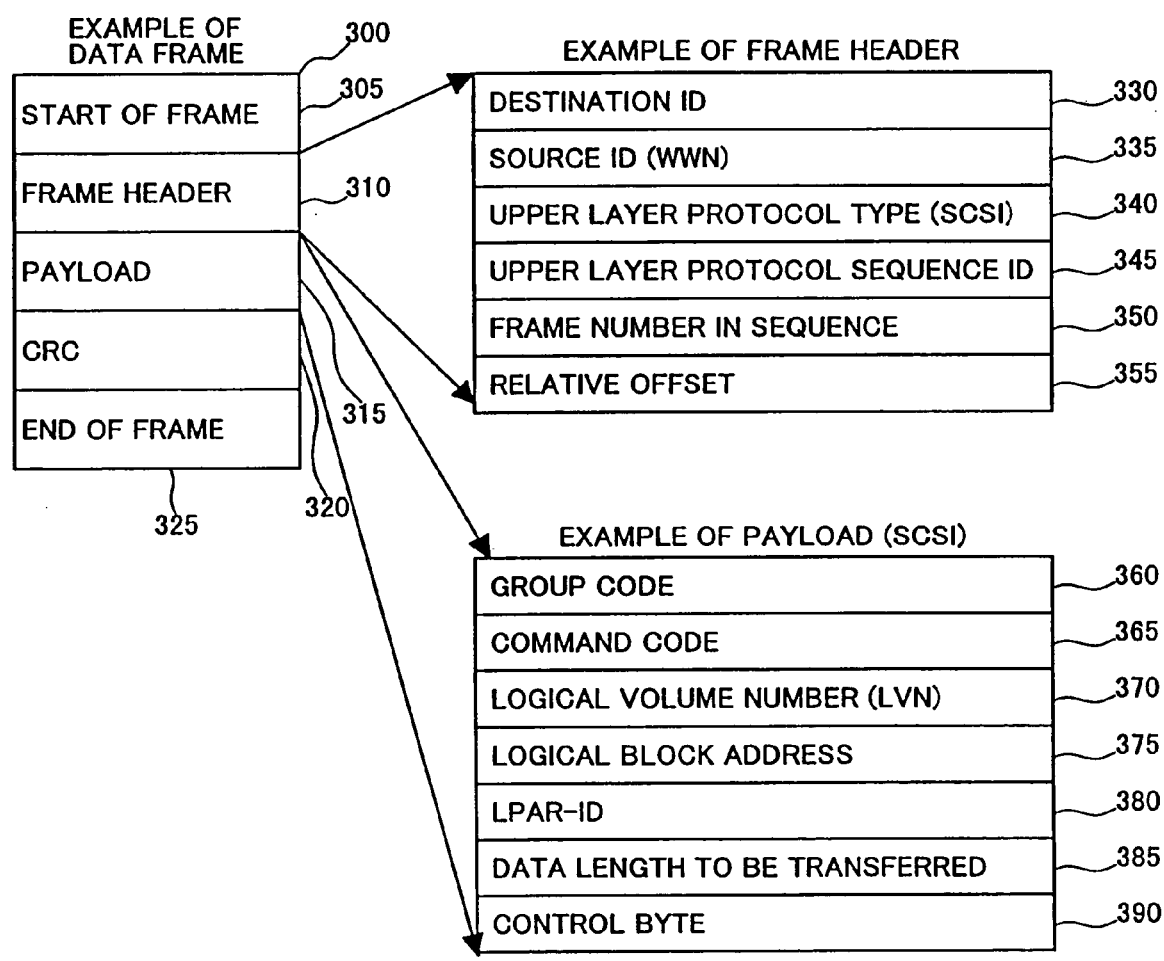
FIG. 3 shows an exemplary structure of a data frame for use in Embodiment 1 of the present invention.

FIG. 3 shows an exemplary structure of a data frame for use in Embodiment 1 of the present invention. This data frame structure is based on a referential format standardized for fiber channels. Reference numeral 300 denotes an exemplary data frame containing the data consisting of several parts. Reference numeral 305 denotes a Start of Frame identifier for letting the I/O adapters 118, 128, 173, and 174 recognize the start of the data frame. Reference numeral 310 denotes a frame header in which an address to which the data frame is transferred and other information are described. The detail on the frame header will be explained later. Reference numeral 315 denotes payload in which upper protocol related data, a command, etc. are stored. The detail on the payload will be explained later. Reference numeral 320 denotes CRC (Cyclic Redundancy Check) used for error detection and correction for the data in the data frame 300. Reference numeral 325 denotes an End of Frame identifier for letting the I/O adapters 118, 128, 173, and 174 recognize the end of the data frame. Next, an exemplary structure of the frame header 310 is described below. Reference numeral 330 denotes a destination port ID field in which the ID of a port of a machine to which the data frame 300 is to be forwarded is specified. Reference numeral 335 denotes a source port ID field in which the ID of a port of a machine from which the data frame has been sent to the disk apparatus 170 is specified. Specifically, the source ID field contains WWN information that is used for exclusion/priority control for the data frame sent from one of different I/O adapters. Reference numeral 340 denotes an upper layer protocol field in which a protocol type to be used for data transfer between the source and the destination is specified; for example, SCSI. Reference numeral 345 denotes an upper layer sequence ID field in which the number in order of a sequence in which the data frame is transmitted during the communication pursuant to the upper layer protocol is specified. Reference numeral 350 denotes a frame number in sequence field in which the ordinal number of the data frame among a plurality of data frames existing in the sequence is specified. Reference numeral 355 denotes a field for destination ID by upper layer protocol and the ID of a port of a machine at which the data frame will arrive eventually is specified in this field. Next, explanation of exemplary contents of the payload is made, assuming that a read command is coded in the payload and the upper layer protocol is SCSI. Reference numeral 360 denotes a group code field; the group code indicates the command length and discriminates between a standard command and a vendor-unique command. Reference numeral 365 denotes a command code field that contains the codes of a read command in this example case. Reference numeral 370 denotes a Logical Volume Number (LVN) field; for example; either logical volume #0 (195) or #1 (196) set among magnetic disks 191 to 194 is specified in this field. Reference numeral 375 denotes a field for the address where object data exists; for example, a logical block address within the logical volume #0 (195) or #1 (196) is specified in this field. Reference numeral 380 denotes an LPAR-ID field; specifically, this field contains the ID number of a discrete OS as specified by the Hypervisor 430. Reference numeral 385 denotes a field for data length to be transferred. In this field, an address range is specified so that the data falling within the range is read. Reference numeral 390 denotes a control byte to contain null data. The null data is added to fill the space for data in the data frame 300 or the payload 315 up to its capacity. A format other than the above exemplary format may be used to incorporate the WWN and LPAR-ID in the data frame and such modification self-evidently comes within the range of the present invention.

Figure 4:
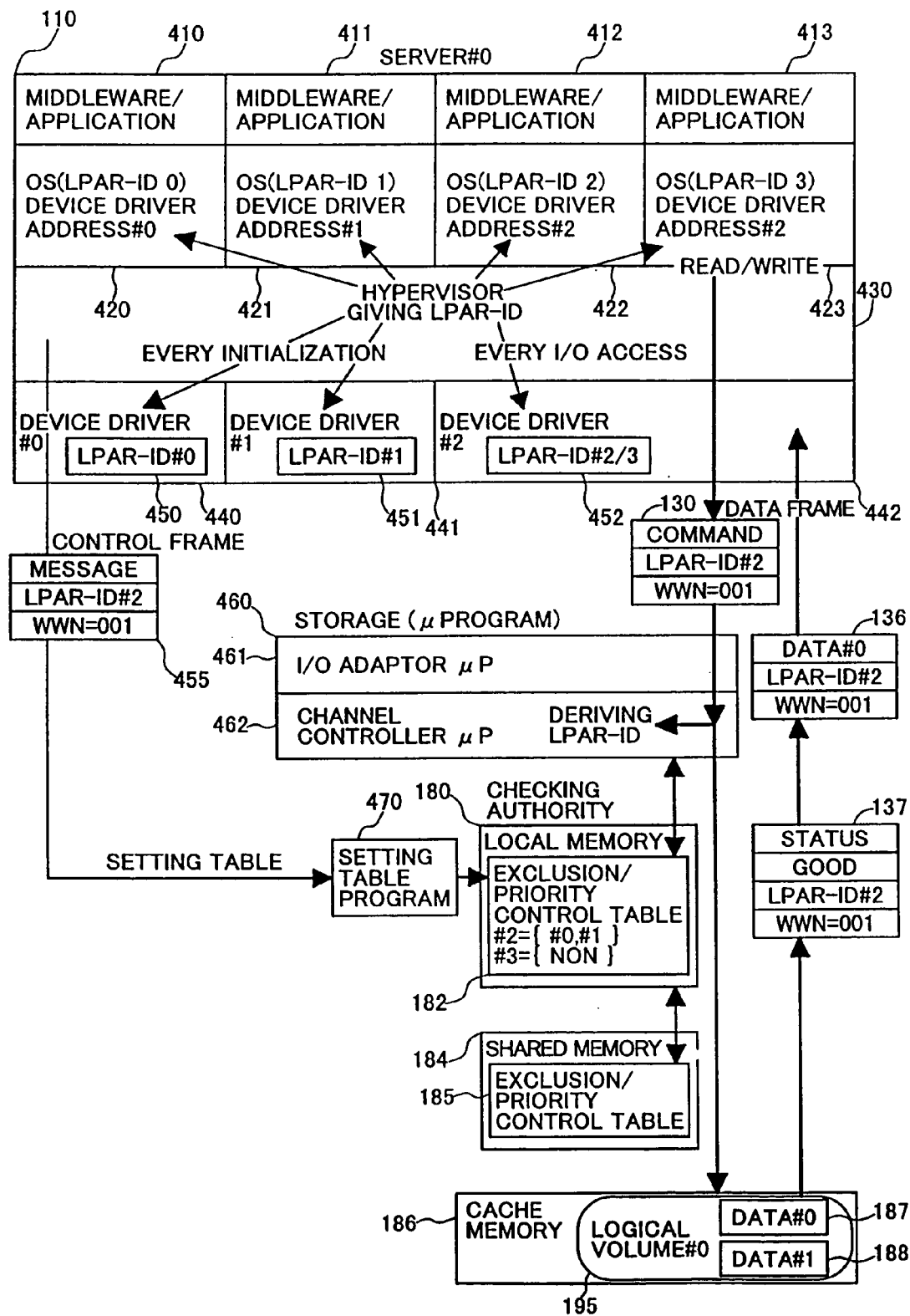
FIG. 4 shows an exemplary structure of software for use in Embodiment 1 of the present invention and illustrates a case where data transfer is successful.

FIG. 4 shows an exemplary structure of software for use in Embodiment 1 of the present invention and illustrates a case where data transfer is successful. Here, only the server #0 (110) is discussed. Reference numerals 410, 411, 412, and 413 denote Middleware/Application composites which are programs for directly receiving processing request from users. Reference numerals 420, 421, 422, and 423 denote OSs that perform the adjustment and processing of request from Middleware/Application 410, 411, 412, and 413. Reference numeral 430 denotes a Hypervisor that allocates the CPUs, main memory, and I/O device in the server #0 (110) among the plurality of OSs 420, 421, 422, and 423 so that these resources are utilized well. The Hypervisor also controls the setting of LPAR-IDs 450, 451, and 452 that are used as the ID numbers of the OSs 420, 421, 422, and 423.

Figure 5:
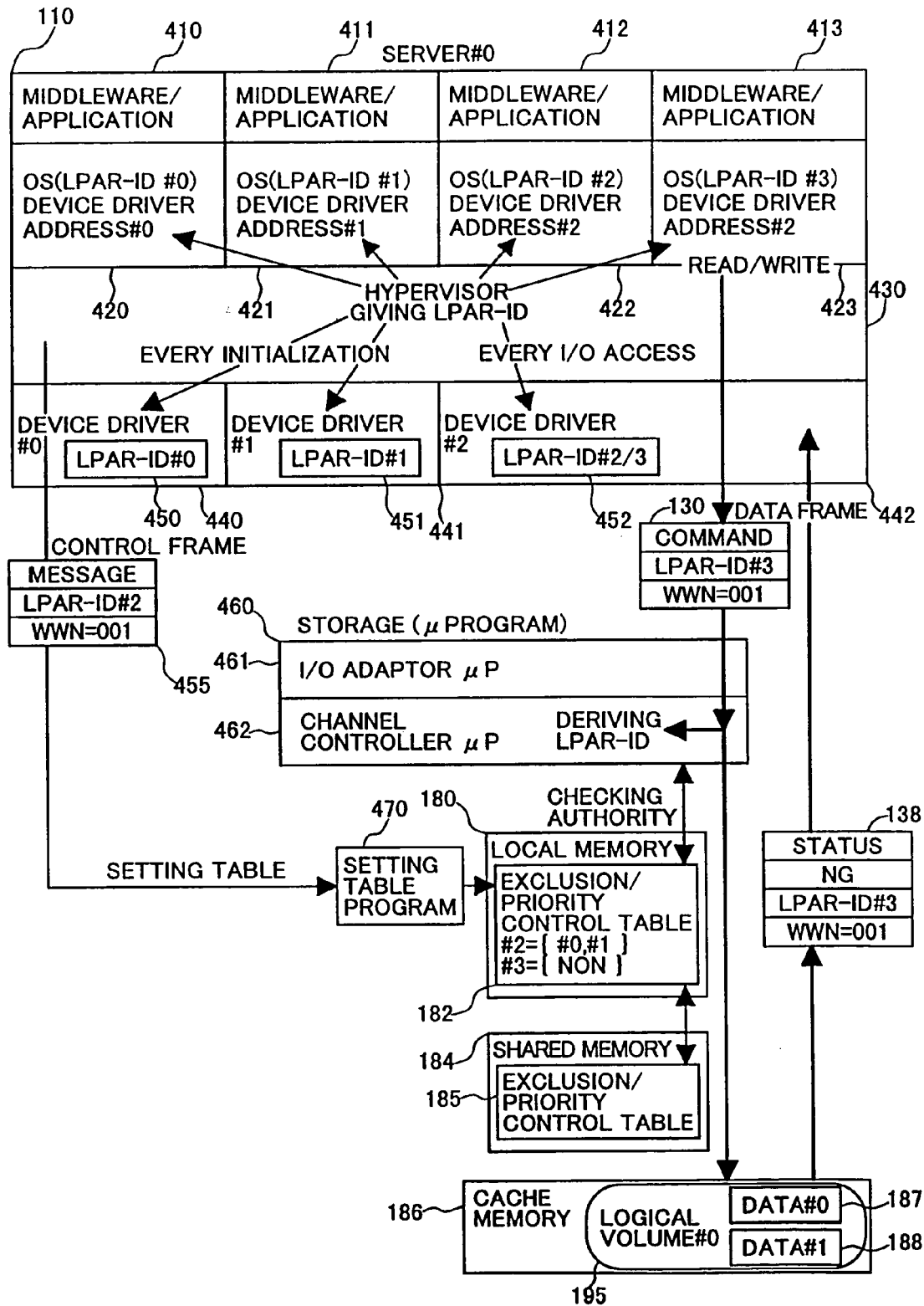
FIG. 5 shows the exemplary structure of software for use in Embodiment 1 of the present invention and illustrates a case where data transfer is unsuccessful.

Reference numerals 440, 441, and 442 denote device drivers that set a command, data, WWN, LPAR-ID, etc. in the data frame 130 when access to the disk apparatus 170 is required and send the data frame to the disk apparatus 170. Reference numeral 455 denotes a control frame. If it is desired to change the control method for the disk apparatus from the server #0 (110), desired settings should be specified in the control frame and this frame is transferred to a Setting Table program existing in the disk apparatus 170. The detail on the control frame will be explained with reference to FIG. 7. Reference numerals 460 and 465 denote micro-programs (µP) for the disk apparatus 170 and the micro-programs (µP) control the I/O adapters 173 and 174, channel controllers 175 and 176 and cache memory 186 of the disk apparatus 170. The micro-program 460 for the disk apparatus 170 is divided into an I/O adapter µP that controls the I/O adapter to carry out frame reception and analysis and a channel controller µP (462) that controls the channel controller to carry out command analysis, exclusion/priority control, and command execution. Furthermore, the channel controller µP (462) derives the WWN and LPAR-ID coded in the data frame 130 therefrom and checks them against the contents of Exclusion/Priority Control Tables 182 and 185, thereby performing exclusion/priority control for I/O access. The detail on the exclusion/priority control will be explained with reference to FIGS. 12, 13, and 14. Reference numeral 470 denotes the Setting Table program. Under the control of this program, a control frame 455 incoming from the server #0 (110) is received and its contents are registered into the Exclusion/Priority Control Tables 182 and 185 in the local memory 180 or the shared memory 184. If access permission for logical volume #0 (195) is granted to the LPAR-ID from the data frame 130 in the Exclusion/Priority Control Tables 182 and 185 existing in the local memory 180 or the shared memory 184 as is the case in FIG. 4, the result of the access will be as follows. Because the access permission is granted to the LPAR-ID, the requested data in the logical volume #0 (195) is read and a frame 136 containing the data together with the LPAR-ID is sent back to the server #0 (110). Moreover, a frame 137 containing status information that data transfer processing has been completed properly together with the LPAR-ID and others is sent back to the server #0 (110). By receiving these frames 136 and 137, the server completes the data access. In such software structure as shown in FIG. 4, there are two ways in which the Hypervisor 430 makes the device drivers 440, 441, and 442 set a particular LPAR-ID. One way is that a particular LPAR-ID is set by each of the device drivers 440, 441 when initial server setup is performed. If there is one-to-one correspondence between the OSs 420, 421 and the device drivers #0 (440), #1 (441), when an LPAR-ID is assigned to an OS, the LPAR-ID for I/O processing request that the corresponding device driver receives is determined. Thus, the OSs 420, 421 and the device drivers #0 (440), #1 (441) receive and set LPAR-ID #0, #1 (450, 451) from the Hypervisor 430 when initial server setup is performed. On I/O access request, the device drivers #0, #1 (450, 451) set the preset LPAR-ID #0, #1, (450, 451) in the data frame 130. The second way is that device driver #2 (442) is notified of LPAR-ID #2/3 (452) whenever I/O access request is issued. Because the OSs 422, 423 share the device driver #2 (442), which OS from which I/O access request will come is unknown before the request is actually issued. Thus, when either OS issues I/O access request to the device driver #2 (442), the LPAR-ID #2/3 (452) preset by the Hypervisor is also delivered to the device driver 442. The device driver #2 (442) sets the LPAR-ID #2/3 (452) it received in the data frame 130. Once one of the LPAR-IDs #0, #1, #2, #3 (450, 451, 452) has been set in the data frame 130 in either way described above, the storage side will distinguish it as described above, thereby enabling exclusion/priority control, because the LPAR-IDs #0, #1, #2, #3 (450, 451, 452) are different even if I/O access request has been issued from among the plurality of OSs (420, 421, 422, 423) that share the same I/O adapter 118. FIG. 5 shows the exemplary structure of software for use in Embodiment 1 of the present invention and illustrates a case where data transfer is unsuccessful. If access permission for logical volume #0 (195) is not granted to the LPAR-ID from the data frame 130 in the Exclusion/Priority Control Tables 182 and 185 existing in the local memory 180 or the shared memory 184 as is the case in FIG. 5, the result of the access will be as follows. Because the access permission is not granted to the LPAR-ID, the data transfer fails to be processed properly, resulting in an error. A frame 138 containing status information that the error has occurred together with the LPAR-ID and others is sent back to the server #0 (110). By receiving this frame 138, the server can judge that it must do error processing as the next step. After receiving this frame, the server generally accesses error information on the disk apparatus and determines the next processing to do. The return of the frames 137 and 138 to the server illustrated in FIGS. 4 and 5 is an example illustrative of a manner in which the present invention is embodied and it is obvious that other information about exclusion/priority control can be returned.

FIG. 6 shows an exemplary Exclusion/Priority Control Table for use in Embodiment 1 of the present invention. By way of example, reference numeral 500 denotes an Exclusion/Priority Control Table for logical volume #0 (195). Reference numerals 505, 510, 515, and 520 denote WWNs that access to the logical volume #0 (195) is possible to occur with one of them assigned. Reference numerals 525, 530, 535, and 540 denote the LPAR-IDs of OSs from which access to the logical volume #0 (195) is possible to occur through the I/O adapter having one of the WWNs. In this table, marking "O" indicates that access to the logical volume #0 (195) with the WWN and LPAR-ID specified is permitted. On the other hand, marking "X" indicates that access to the logical volume #0 (195) with the WWN and LPAR-ID specified is excluded. The control method will be explained in detail with reference to FIG. 13. Exclusion control #2 described in the table means that the control is performed, according to a priority control method which will be illustrated in detail in FIG. 15. Priority control described in the table means that the control is performed, according to a priority control method that will be illustrated in FIG. 15. Even if other exclusion control is used, self-evidently, it can be implemented if registered in the Exclusion/Priority Control Table 500. Exclusion/Priority Control Tables per logical volume exist and these tables in a set exist in the local memories 180, 181 and the shared memory 184 (Exclusion/Priority Control Tables 182, 183, and 185). The channel controllers 175 and 176 perform exclusion/priority control by referring to these tables. These Exclusion/Priority Control Tables are created or modified by the Setting Table program in accordance with the control frame 455 sent from either server #0 or #1 (110, 120) via the LAN 145 when the program receives this frame. The detail on the control frame 455 will be explained with reference to FIG. 7.

Figure 7:
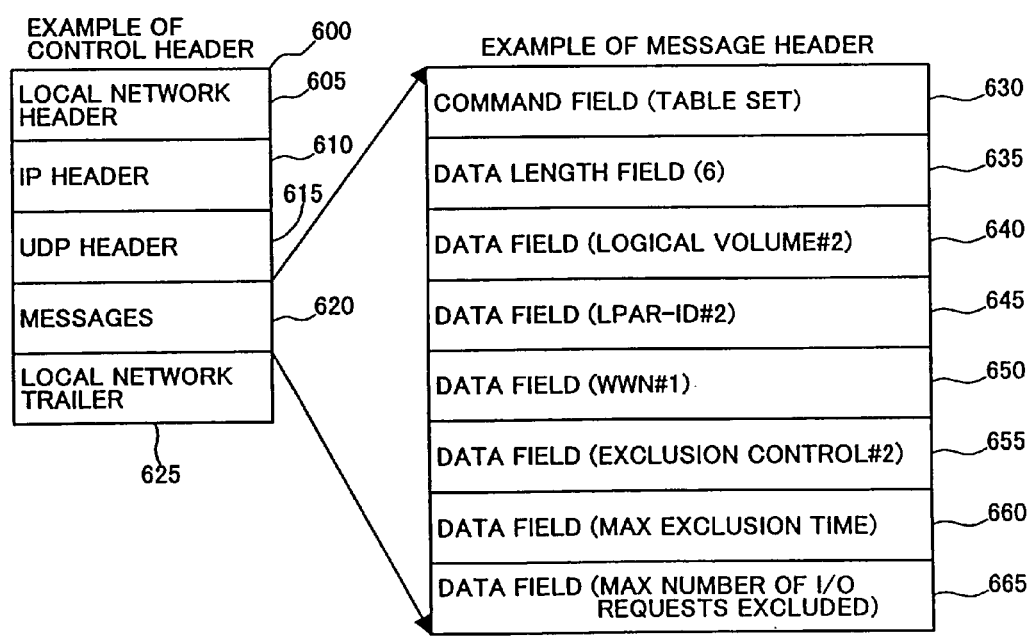
FIG. 7 shows an exemplary control frame for use in Embodiment 1 of the present invention.

FIG. 7 shows an exemplary structure of the control frame for use in Embodiment 1 of the present invention. This example of control frame structure is based on IP and UDP protocols that are used as reference. An example of message structure is based on SNMP (Simple Network Management Protocol) that is used as reference. A local network header 605 contains control information such as address, data length, etc. required for LAN communication. An IP header 610 contains control information such as address, data length, etc. required for communication using IP. A UDP header 615 contains control information such as address, data length, etc. required for communication using UDP. Other protocols than those mentioned herein can be used and such modification self-evidently comes within the range of the present invention. Reference numeral 620 denotes a message part which will be detailed later. Reference numeral 625 denotes a local network trailer in which a data error check code, end of data code, etc are described. Next, an exemplary structure of the message 620 part will be described below. Reference numeral 630 denotes a command field and the message in this filed tells the disk apparatus what to do. In this example, the command field contains an instruction to set parameters in an Exclusion/Priority Control Table. Reference numeral 635 denotes a data length field and the value specified in this field indicates the number of data fields that follow. In this example, the value indicates six data fields that follow. Reference numerals 640 to 665 denote data fields in which parameters to be set in the Exclusion/Priority Control Tables are described. In this example, the contents of these data fields indicate that exclusion control #2 (655) is performed for access to logical volume #2 (640) with LPAR-ID #2 (645) and WWN#1 (650) specified, subject to the constraints of the maximum exclusion processing time (660) and the maximum number of I/O requests excluded (665). It is conceivable that other information such as priority in performing priority control be included in the data fields.

Figure 8:
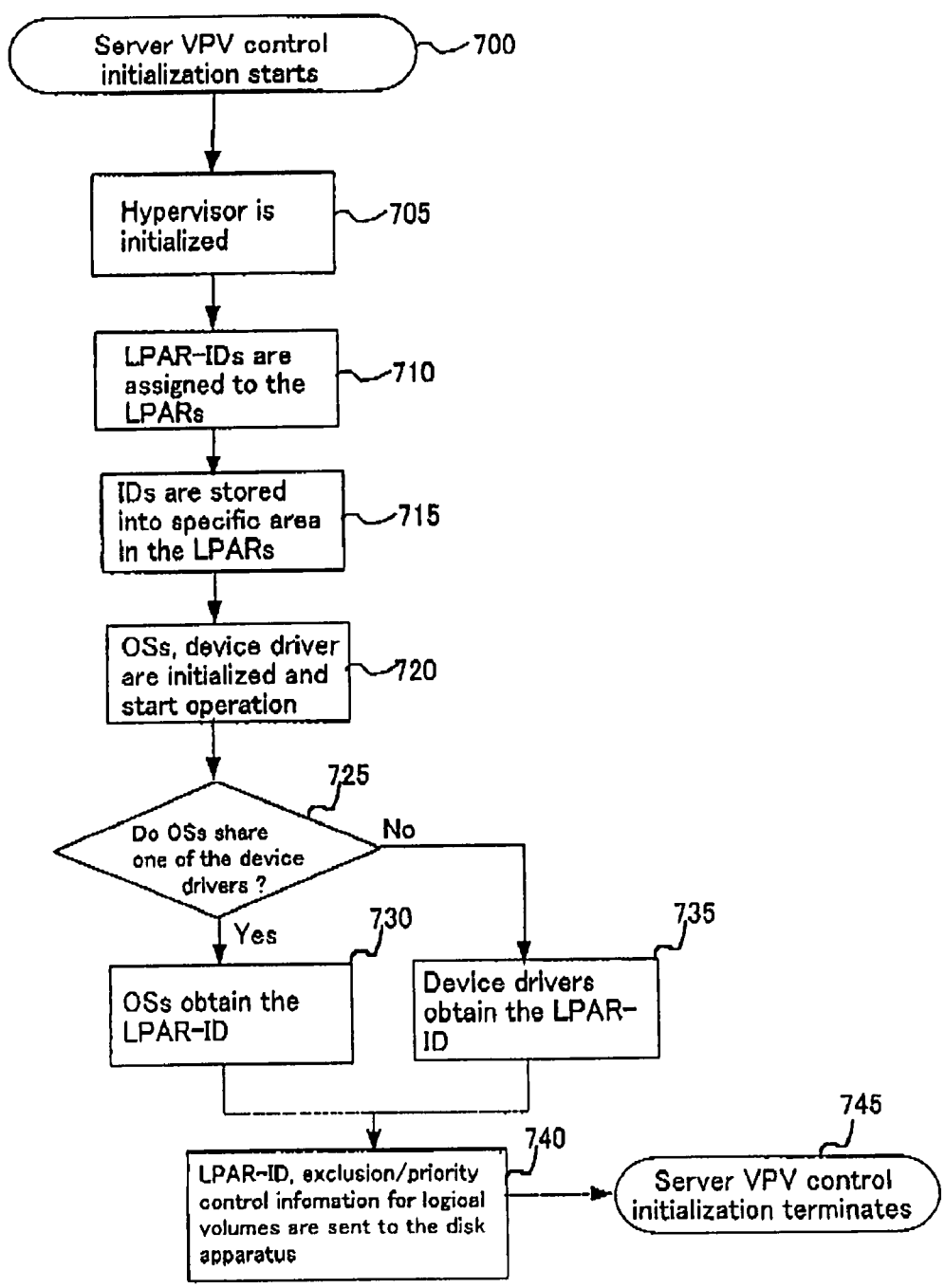
FIG. 8 shows a flowchart of server VPV control initialization in Embodiment 1 of the present invention.

FIG. 8 shows a flowchart of server VPV control initialization in Embodiment 1 of the present invention. This flowchart illustrates initialization for Virtual Private Volume (VPV) control to be performed on the side of server #0 (110). The server VPV control initialization starts with step 700. First, the Hypervisor is initialized in step 705. LPAR-IDs #0 (450), #1 (451), and #2/3 (452) are assigned to the LPARs (OSs) in step 710. The IDs are stored into specific area in the LPARs in step 715. The OSs 420, 421, 422, and 423 and the device drivers 440, 441, and 442 are initialized and started in operation in step 720. Among the OSs 420, 421, 422, and 423, whether multiple OSs share one of the device drivers 440, 441, and 442 is judged in step 725. If the OSs do not share a device driver (this is true for the OSs 420 and 421, the device drivers 440, 441 obtain the LPAR-ID #0 (45-), #1 (451) respectively stored in the LPARs. If the OSs share one of the device drivers 440, 441, and 442 (this is true for the OSs 422 and 423), the OSs 422 and 423 obtain the LPAR-ID #2/3 (452). In step 740, the LPAR-IDs #0 (450), #1 (451), #2/3 (452) and exclusion/priority control information for logical volumes #0, #1 (195, 196) are sent to the disk apparatus by using the control frame 455. Then, the server VPV control initialization terminates in step 745.

Figure 9:
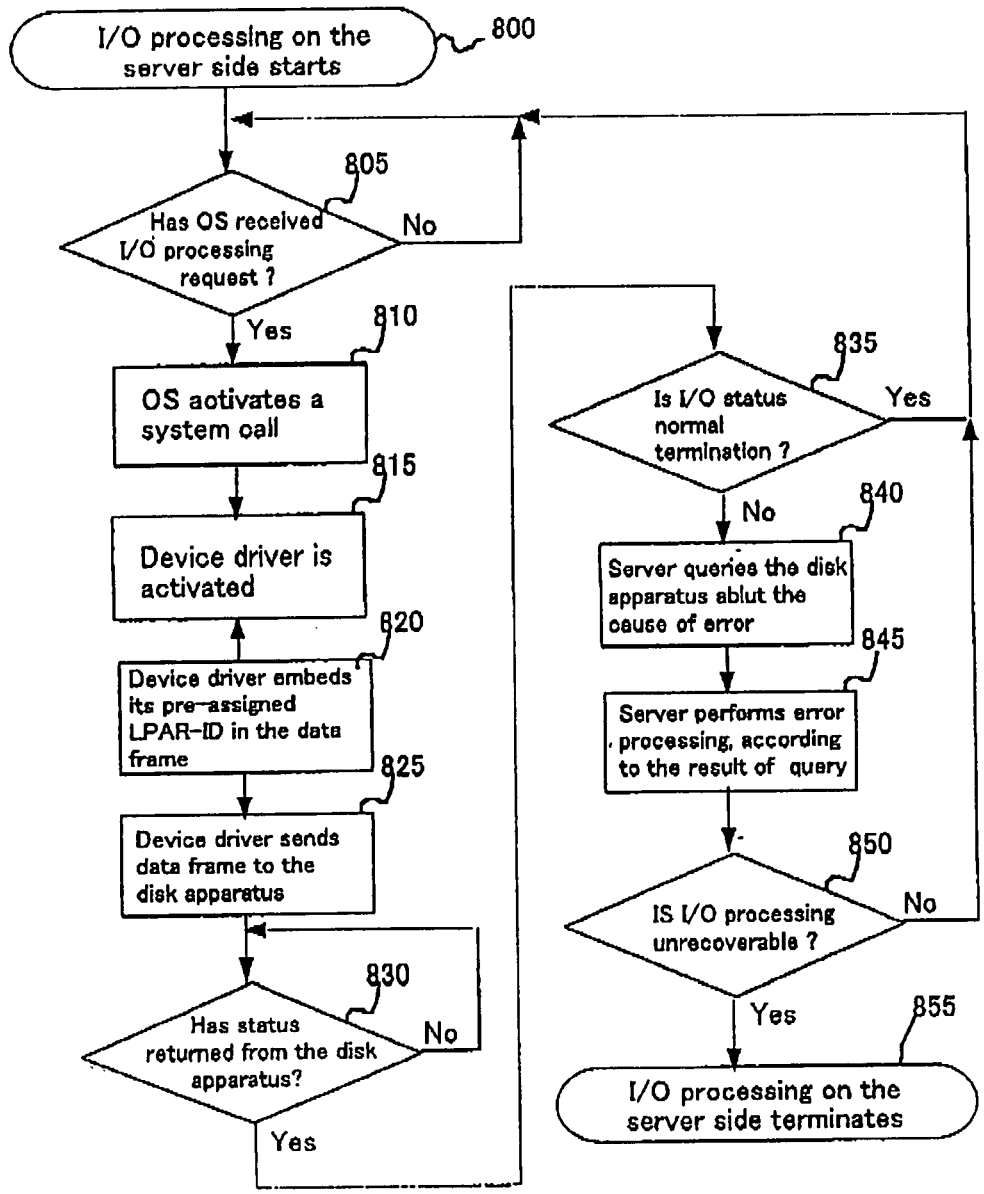
FIG. 9 shows a flowchart of I/O processing on the server side (with any device driver not shared) in Embodiment 1 of the present invention.

FIG. 9 shows a flowchart of I/O processing on the server side (with any device driver not shared) in Embodiment 1 of the present invention. This flowchart illustrates a normal I/O processing flow after the completion of initialization, wherein the OSs do not share any device driver. The I/O processing on the server side starts with step 800. Whether either OS 420 or 421 has received I/O processing request is judged in step 805. If neither OS has received I/O processing request, the step 805 is repeated. If either OS has received I/O processing request, the process goes to step 810 and the OS 420 or 421 activates a system call for the corresponding device driver 440 or 441. The appropriate device driver 440 or 441 is activated in step 815. In step 820, the device driver 440 or 441 embeds its pre-assigned LPAR-ID #0 (440) or #1 (451) in the data frame 130. In step 830, whether status in response to the sent data frame has been returned from the disk apparatus 170 is judged. If the status has not been returned, the step 830 is repeated. If the status has been returned, the process goes to step 840 and whether the I/O status is normal termination of I/O processing is judged. In the event of abnormal termination, the process goes to step 840 and the server queries the disk apparatus about the cause of error. In step 845, the server #0 (110) performs error processing, according to the result of the query. Whether I/O processing is unrecoverable is judged in step 850. If it is recoverable, the process goes back to the step 805. If it is unrecoverable, the process goes to step 844 and the I/O processing on the server side terminates.

Figure 10:
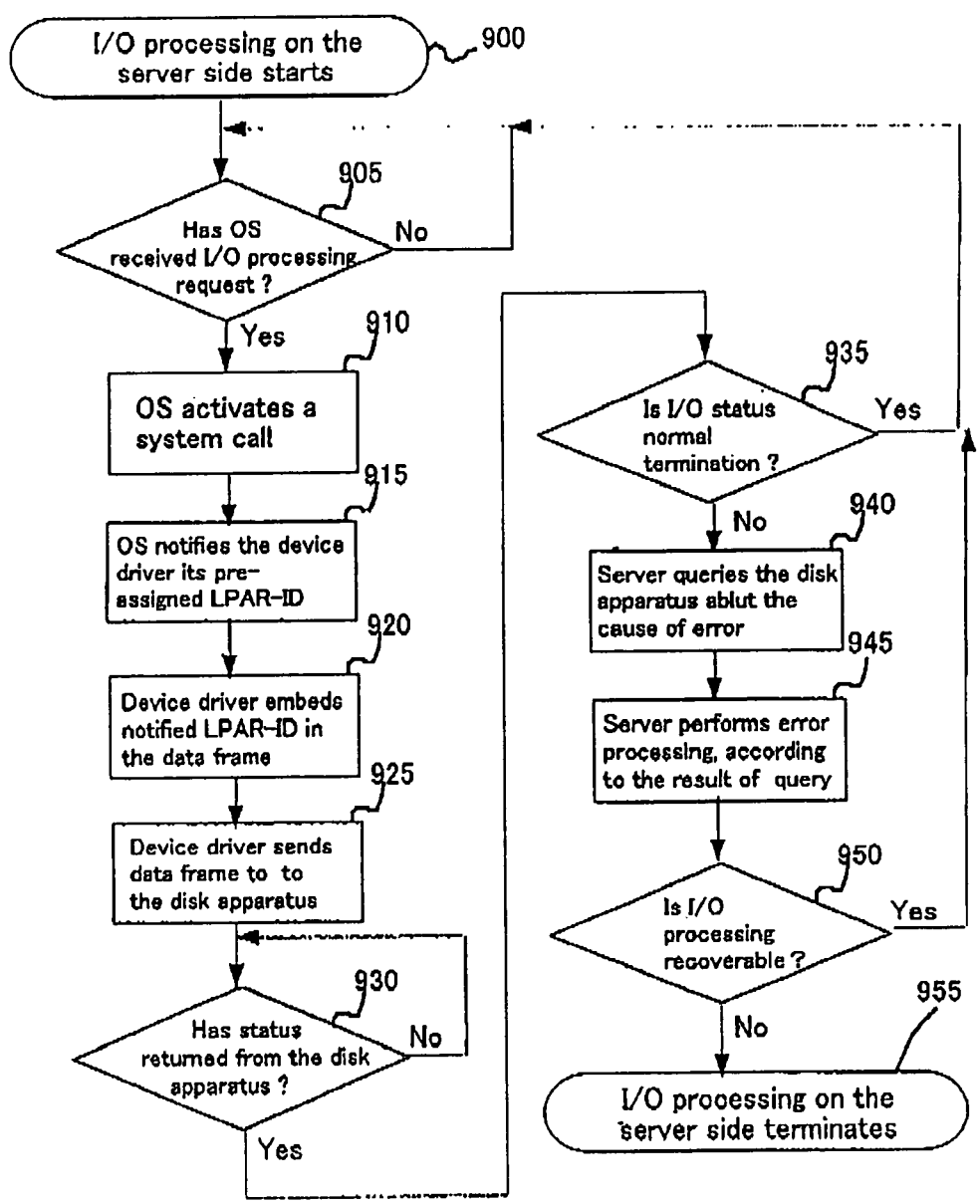
FIG. 10 shows a flowchart of I/O processing on the server side (with a device driver shared) in Embodiment 1 of the present invention.
Figure 11:
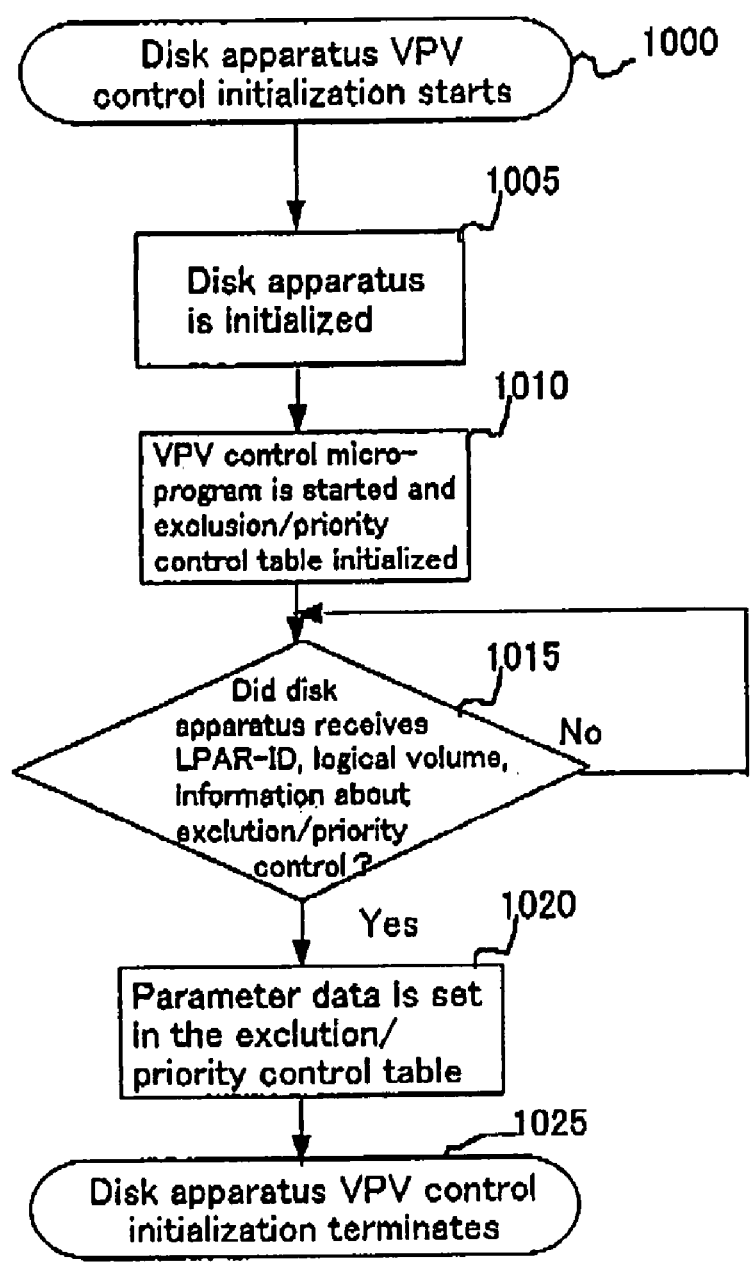
FIG. 11 shows a flowchart of disk apparatus VPV control initialization in Embodiment 1 of the present invention.

FIG. 10 shows a flowchart of I/O processing on the server side (with a device driver shared) in Embodiment 1 of the present invention. This flowchart illustrates a normal I/O processing flow after the completion of initialization, wherein the OSs share a device driver. The I/O processing on the server side starts with step 900. Whether either OS 422 or 423 has received I/O processing request is judged in step 905. If neither OS has received I/O processing request, the step 905 is repeated. If either OS has received I/O processing request, the process goes to step 910 and the OS 422 or 423 activates a system call for the device driver 442. In step 915, the OS 422 or 423 notifies the device driver 442 its pre-assigned LPAR-ID #2/3 (452). In step 920, the device driver 442 embeds the notified LPAR-ID #2/3 (452) in the data frame 130. Because step 930 and subsequent steps are the same as the step 830 and subsequent steps illustrated in FIG. 9, their explanation will not be repeated. FIG. 11 shows a flowchart of disk apparatus VPV control initialization in Embodiment 1 of the present invention. This flowchart illustrates initialization for Virtual Private Volume (VPV) control to be performed on the side of disk apparatus 170. The disk apparatus VPV control initialization starts with step 1000. The disk apparatus 170 is initialized in step 1005. In step 1010, the VPV control micro-program is started in operation and the Exclusion/Priority Control Tables 182, 183, and 185 are initialized. In step 1015, the disk apparatus receives LPAR-ID, logical volume, and information about exclusion/priority control contained in the control frame 455 from the server #0 (110). Unless the disk apparatus receives such parameter data, the step 1015 is repeated. After the disk apparatus receives such parameter data, the parameter data is set in the Exclusion/Priority Control Tables 182, 183, and 185 in step 1020. Then, the disk apparatus VPV control initialization terminates in step 1025.

Figure 12:
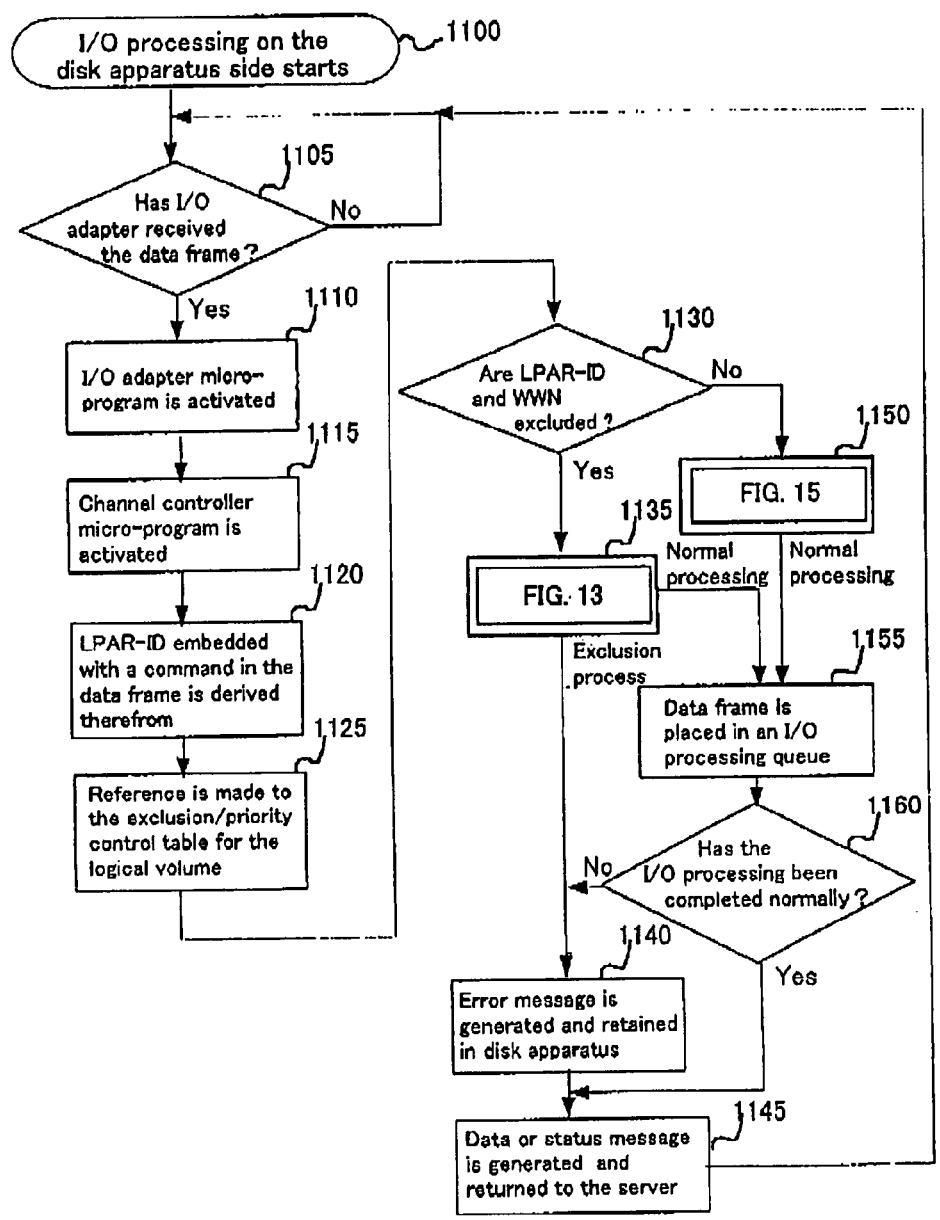
FIG. 12 shows a flowchart of I/O processing on the disk apparatus side in Embodiment 1 of the present invention.

FIG. 12 shows a flowchart of I/O processing on the disk apparatus side in Embodiment 1 of the present invention. This flowchart illustrates a normal I/O processing flow to take place in the disk apparatus 170 after the completion of initialization. The I/O processing on the disk apparatus side starts with step 1100. Whether either I/O adapter 173 or 174 has received a data frame of I/O processing request is judged in step 1105. If neither I/O adapter has received the data frame, the step 1105 is repeated. If either I/O adapter has received the data frame, the process goes to step 1110 and the I/O adapter micro-program 461 is activated. In step 1115, the channel controller micro-program 462 is activated. In step 1120, the LPAR-ID 380 embedded with a command in the data frame is derived therefrom. In step 1125, reference is made to the Exclusion/Priority Control Table 500 for the logical volume 370 that is the target of I/O processing. In step 1130, the LPAR-ID 180 and WWN 335 for I/O access are looked up and whether the LPAR-ID and WWN combination is excluded by exclusion control is judged. If that combination is not excluded by exclusion control, the process goes to priority control processing in step 1150. The step 1150 will be explained in detail with reference to FIG. 15. If that combination is excluded by exclusion control, the process goes to step 1135. The step 1135 will be explained in detail with reference to FIG. 13. After the priority control processing in the step 1150 and as the result of the step 1135, if normal processing is determined, the data frame is placed in an I/O access processing queue in step 1155 and allowed to await I/O processing of the cache memory 186 or any of the magnetic disks 191, 192, 193, and 194. If exclusion processing is determined as the result of the step 1135, the process goes to step 1140. In step 1160, whether the I/O processing for the enqueued data frame has been completed normally is judged. If the judgment is normal completion, the process goes to step 1145. If the judgment is abnormal termination, the process goes to the step 1140. In the step 1140, an error message is generated and retained in the disk apparatus. In the step 1145, a data or status message is generated and returned to the server. Then, the process returns to the step 1105.

Figure 13:
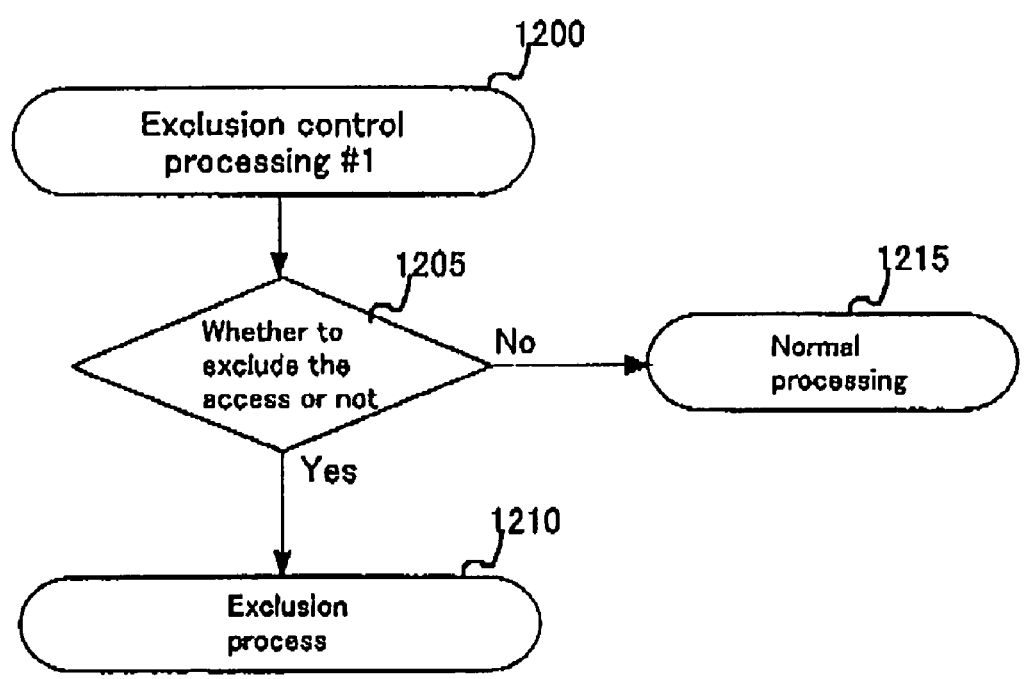
FIG. 13 shows a flowchart of a first example of exclusion control processing in Embodiment 1 of the present invention.

FIG. 13 shows a flowchart of a first example of exclusion control processing in Embodiment 1 of the present invention. This flowchart illustrates the simplest exclusion control flow as the concrete control procedure for the step 1135 in FIG. 12. The exclusion control processing #1 starts with step 1200. Whether to exclude the access is judged in step 1200. If the access is to be excluded, the process goes to exclusion processing in step 1215. If not, the process goes to normal processing in step 1205.

Figure 14:
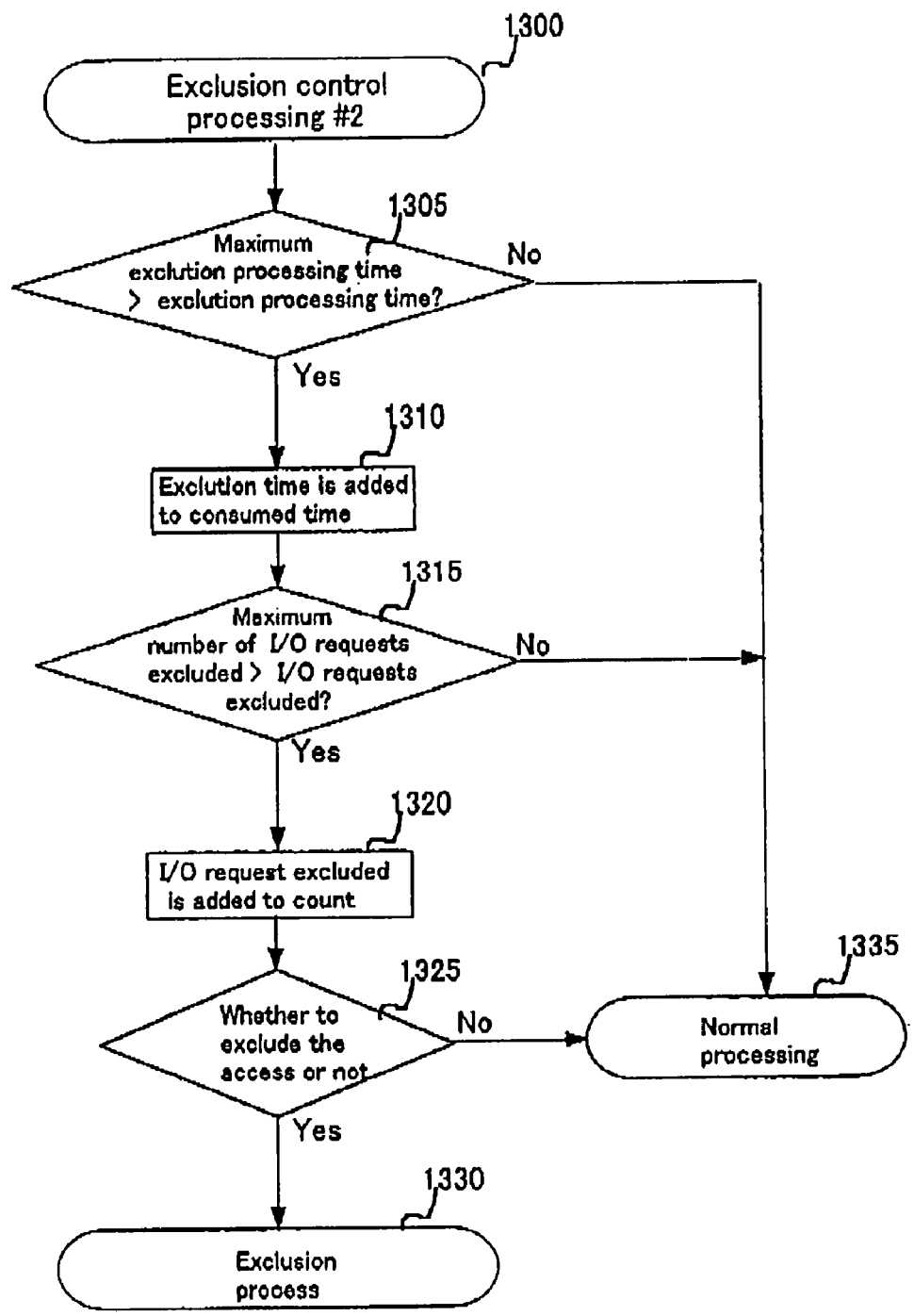
FIG. 14 shows a flowchart of a second example of exclusion control processing in Embodiment 1 of the present invention.
Figure 15:
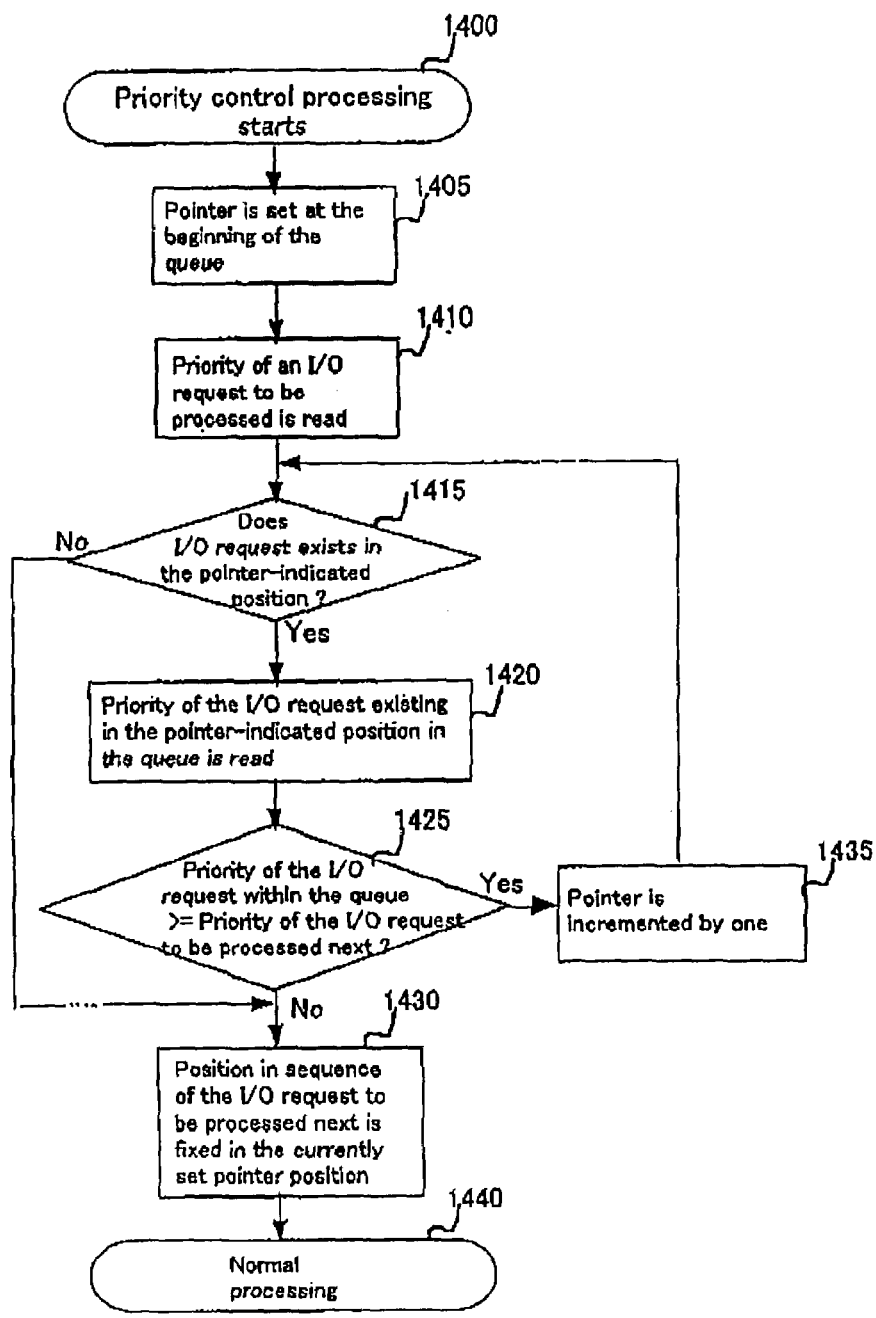
FIG. 15 shows a flowchart of priority control processing in Embodiment of the present invention.

FIG. 14 shows a flowchart of a second example of exclusion control processing in Embodiment 1 of the present invention. This flowchart illustrates a restricted exclusion control flow, subject to the constraints of processing time and the number of I/O requests to be processed, as a concrete control procedure for the step 1135 in FIG. 12. The exclusion control processing #2 starts with step 1300. In step 1305, whether the time consumed in exclusion processing until now is less than the preset maximum exclusion processing time (660) is judged. If the consumed time is less than the maximum time, the process goes to step 1310. If the consumed time is equal to or exceeds the maximum time, the process goes to step 1335 for normal processing. In the step 1310, time required for further exclusion is added to the consumed time. In step 1315, whether the number of I/O requests excluded until now is less than the preset maximum number of I/O requests excluded (665) is judged. If the number is less than the preset maximum, the process goes to step 1320. If the number is equal to or exceeds the preset maximum, the process goes to the step 1335 for normal processing. In the step 1320, I/O request to be excluded further is added to the count. Whether to exclude the access is judged in step 1325. If the access is to be excluded, the process goes to exclusion processing in step 1330. If not, the process goes to normal processing in the step 1335. FIG. 15 shows a flowchart of an example of priority control processing in Embodiment of the present invention. This flowchart illustrates a flow wherein the sequence in which I/O request data frames are processed is changed without performing exclusion control. This example is based on SCSI-standardized tag queuing that is used as reference. The priority control processing starts with step 1400. In step 1405, a pointer for determining the sequence in which the I/O request data frames are processed is set at the beginning of the queue. In step 1410, the priority of an I/O request data frame, the next to be processed, is read. In step 1415, whether an I/O request data frame exists in the pointer-indicated position within the queue is judged. If such I/O request data frame does not exist, the process goes to step 1430. If such I/O request data frame exists, the process goes to step 1420 where the priority of the I/O request data frame existing in the pointer-indicated position within the queue is read. In step 1425, whether the priority of the I/O request data frame within the queue is higher than the priority of the I/O request data frame, the next to be processed is judged. If the priority of the former is higher, the process goes to step 1435 where the pointer is incremented by one and returns to the step 1415. If the priority of the former is lower, the process goes to the step 1430. In the step 1430, the position in sequence of the I/O request data frame, the next to be processed is fixed in the currently set pointer position. In the step 1440, normal processing is entered. Using other method than the above flow examples, exclusion/priority control may also be carried out and such modification self-evidently comes within the range of the present invention.

According to Embodiment 1 illustrated in FIGS. 1 to 15, a data frame including a particular LPAR-ID is sent to the disk apparatus and exclusion control is performed, based on the LPAR-ID, on the disk apparatus side that received the data frame, so that exclusive control can be accomplished even for a plurality of OSs that share an I/O adapter. Moreover, the disk apparatus side has the Exclusion/Priority Control Tables in which both LPAR-IDs and WWNs are taken into consideration. Thereby, even if OSs of the same ID run on multiple servers and issue access requests, consistent exclusion/priority control can be accomplished on the disk apparatus side. Furthermore, the invention is embodied so that selection can be made out of a plurality of exclusion/priority control methods, thereby making it possible to perform flexible exclusive control and optimize the performance.

Embodiment 2

A preferred Embodiment 2 of the present invention is illustrated in the appended drawings and described in detail below.

Figure 16:
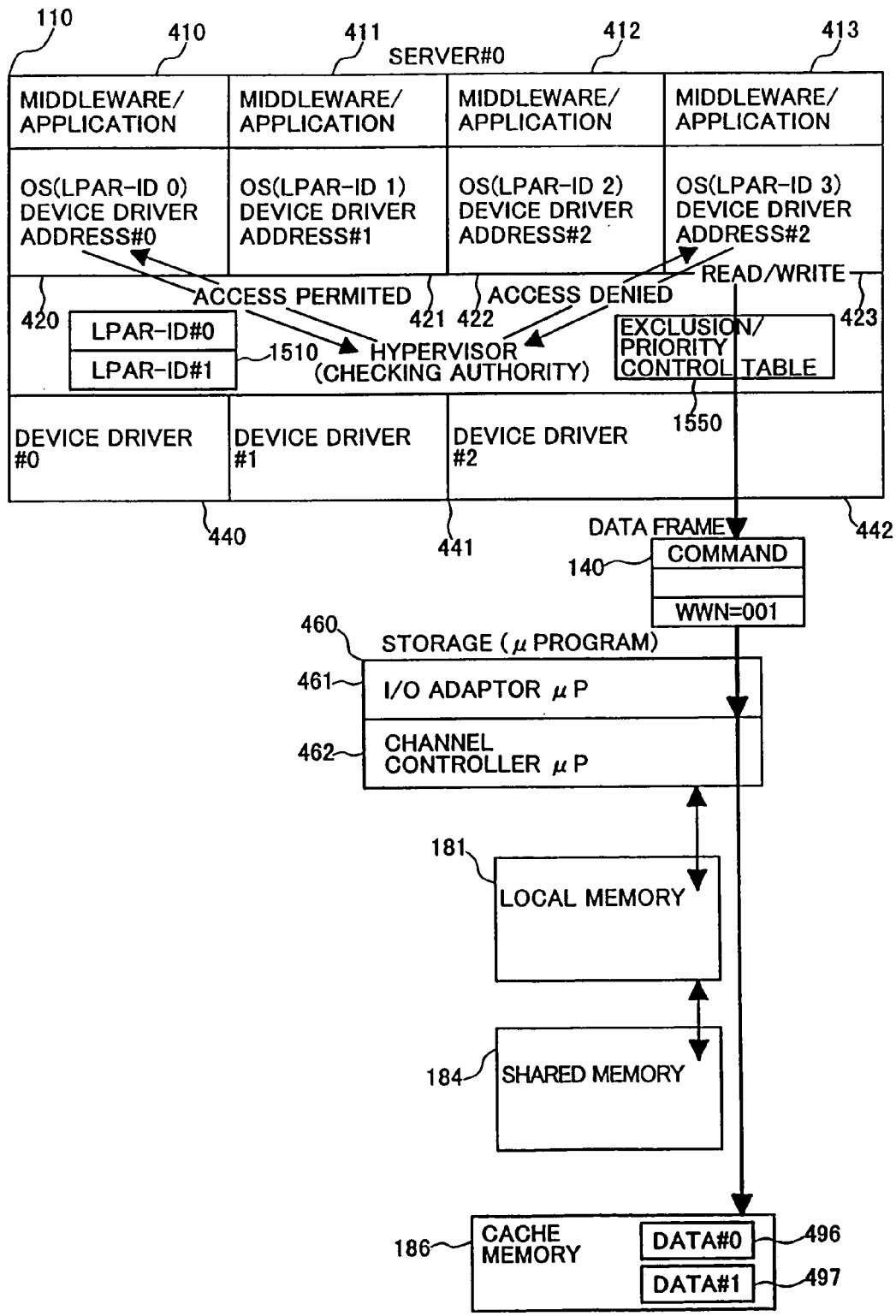
FIG. 16 shows an exemplary structure of software for use in Embodiment 2 of the present invention.

FIG. 16 shows an exemplary structure of software for use in Embodiment 2 of the present invention. While exclusion/priority control is performed on the disk apparatus 170 in Embodiment 1, alternatively, it is possible that this control execution is limited within a single server #0 (110) and processing is executed by a Hypervisor 1500 if the server #0 (110) and the Hypervisor 1500 have a high processing capability. In this case, the Hypervisor 1500 receives all I/O access requests and executes exclusion/priority control by using LPAR-IDs 1510 stored in the Hypervisor and its Exclusion/Priority Control Table. If access is permitted, the I/O access request is sent to the disk apparatus 170 as is. Unless access is permitted, the I/O access request is returned to the OS (420) that issued it as an error. According to Embodiment 2 illustrated in FIG. 16, exclusion/priority control among the OSs can be achieved without modifying the disk apparatus 170 and the data frame 140.

Embodiment 3

A preferred Embodiment 3 of the present invention is illustrated in the appended drawings and described in detail below.

Figure 17:
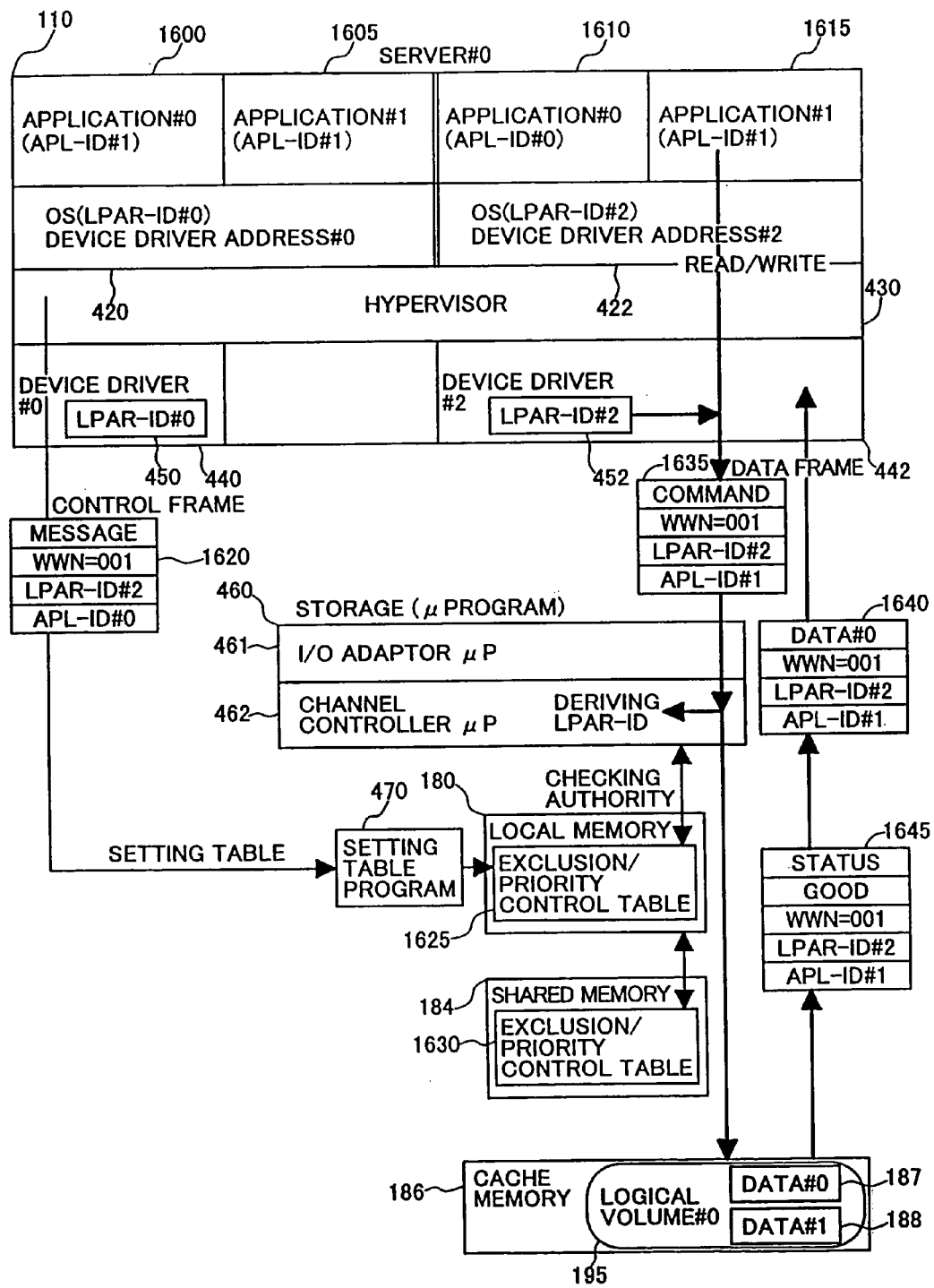
FIG. 17 shows an exemplary structure of software for use in Embodiment 3 of the present invention.

FIG. 17 shows an exemplary structure of software for use in Embodiment 3 of the present invention. As concerns Embodiments 1 and 2, exclusion/priority control is performed in units of OSs, each having an LPAR-ID. However, some user may prefer exclusion in units of applications. For applications under the same OS, the OS executes exclusion/priority control. For exclusion/priority control among applications under a plurality of OSs, the disk apparatus 460 or the Hypervisor 430 must execute such control as is the case in Embodiments 1 and 2. If it is desired to give priority to, for example, data access from Application #1 (1605, 1615), when access request is issued from the Application #1 (1605, 1615), its ID (APL-ID) per application, as well as the LPAR-ID, is attached to a data frame 1635, and the data frame is sent to the disk apparatus 460. On the disk apparatus 460 side, exclusion/priority control is performed, based on the information for exclusion/priority control per application, registered in the Exclusion/Priority Control Tables 1625 and 1630, after offered in a control frame 1620 received beforehand. The result of this control for access is reported to the server #0 (110) as data 1645 and status 1645. This result will be as follows: unless the OSs identified by LPAR-ID #0 (450) and LPAR-ID # 2 are excluded for access, priority is given to the data access from the Application #1 no matter which OS is.

Figure 19:
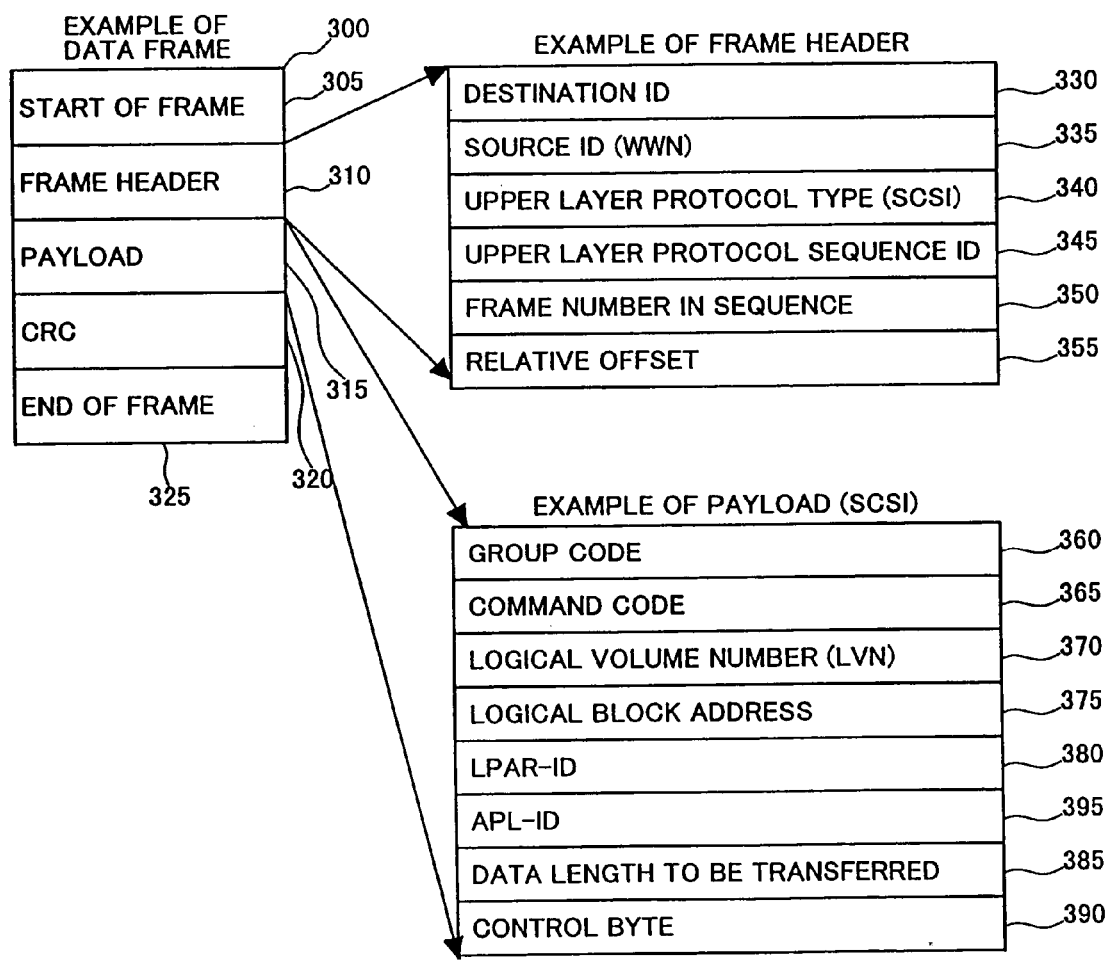
FIG. 19 shows an exemplary structure of a data frame for use in Embodiment 3 of the present invention.

FIG. 18 shows exemplary Exclusion/Priority Control Tables for use in Embodiment 3 of the present invention. Because accessibility judgment is also made by exclusion/priority control per application in Embodiment 3, one additional table is used more than the corresponding table shown in FIG. 6. Reference numeral 1625-*a* denotes an exemplary Exclusion/Priority Control Table (WWN-LPAR relation) and this type of table corresponds to the Exclusion/Priority Control Table 500 shown in FIG. 6. Reference numeral 1625-*b* denotes an exemplary Exclusion/Priority Control Table (WWN-APL relation). For each APL and WWN combination among APLs (1720 to 1735) for WWNs (1700 to 1715), whether the logical volume, for example, #0, is accessible by exclusion/priority control is specified in this table FIG. 19 shows an exemplary structure of a data frame for use in Embodiment 3 of the present invention. This data frame structure is basically the same as shown in FIG. 3, except that an APL-ID (395) field to contain an application ID is added to the payload 315.

Figure 20:
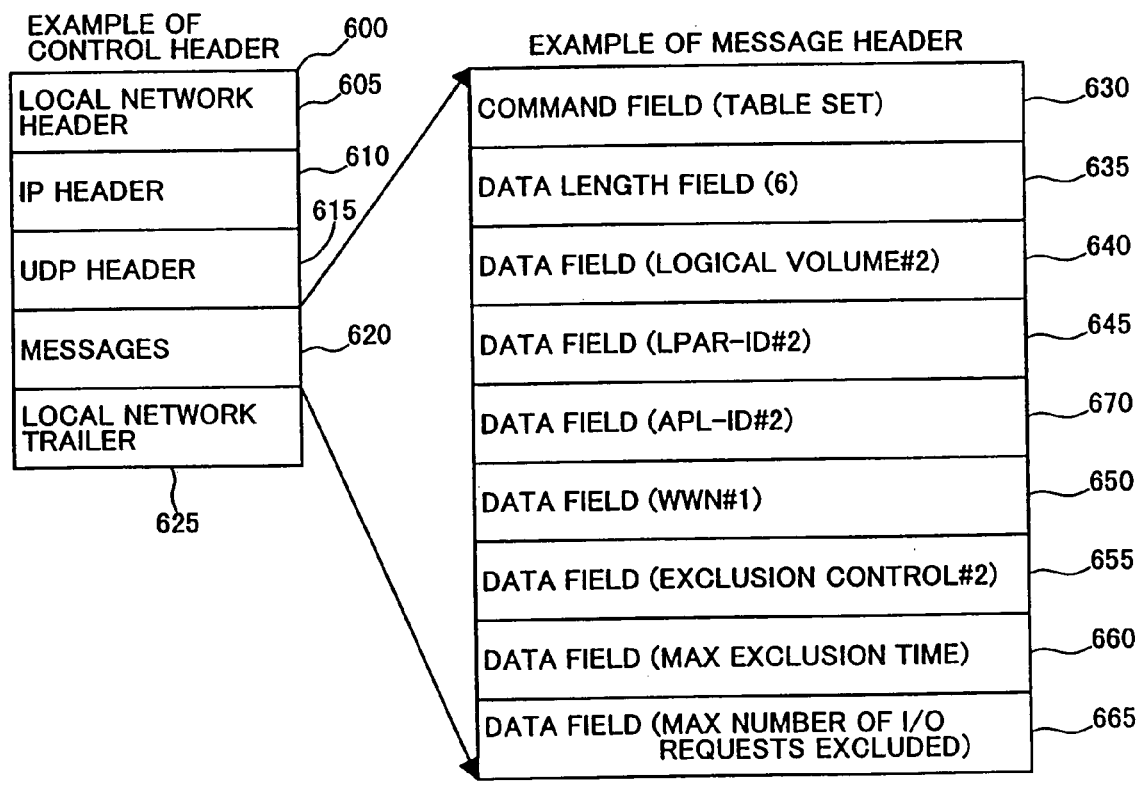
FIG. 20 shows an exemplary control frame for use in Embodiment 3 of the present invention.

FIG. 20 shows an exemplary control frame for use in Embodiment 3 of the present invention. This control frame structure is basically the same as shown in FIG. 7, except that an APL-ID (670) data field to contain an application ID is added to the message 620 part. According to Embodiment 3 illustrated in FIG. 17, exclusion/priority control among applications running under different OSs can be performed in the same manner as illustrated in the flowcharts of control/exclusion control processing in FIGS. 13 and 14.

In accordance with the present invention, when one of a plurality of OSs that share an I/O device is accessing disk apparatus the disk apparatus can recognize ID number assigned to each OS and ID number assigned to each application. Consequently, the disk apparatus side can perform exclusive control for data among the OSs and applications and security can be enhanced. Furthermore, priority control for access can also be performed and the performance of a virtual private volume system can be optimized.

The foregoing invention has been described in terms of preferred embodiments. However, those skilled, in the art will recognize that many variations of such embodiments exist. Such variations are intended to be within the scope of the present invention and the appended claims.

What is claimed is:

1. A storage controller device comprising:
an I/O adaptor for inputting or outputting data from an external device;
a shared memory connected to said I/O adaptor;
a disk controller unit connected to said shared memory; and
a plurality of disk devices connected to said disk controller,
wherein said shared memory stores information for exclusion/priority controlling, from said external device,
said disk controller unit processes exclusive/priority controlling for access from said external device,
said information includes a World Wide Name (WWN) for accessing a logical volume in at least one of said plurality of disk devices related to application-identification which corresponds to said WWN, and
said information includes an I/O adaptor identification number for accessing a logical volume in at least one of said plurality of disk devices related to an OS identification number which accesses from said I/O adaptor which has said OS identification number.

2. A storage controller device according to claim 1,
wherein a relationship between said WWN and Logical Partitioning (LPAR)-identification is marked in said information.

3. A storage controller device according to claim 2,
wherein said disk controller unit processes data which has low priority ahead.

4. A storage controller device according to claim 1,
wherein a relationship between said WWN and LPAR-identification is marked in said information.

5. A storage controller device according to claim 4,
wherein said disk controller unit processes data which has low priority ahead.

* * * * *